UNITED STATES PATENT OFFICE 2,647,860

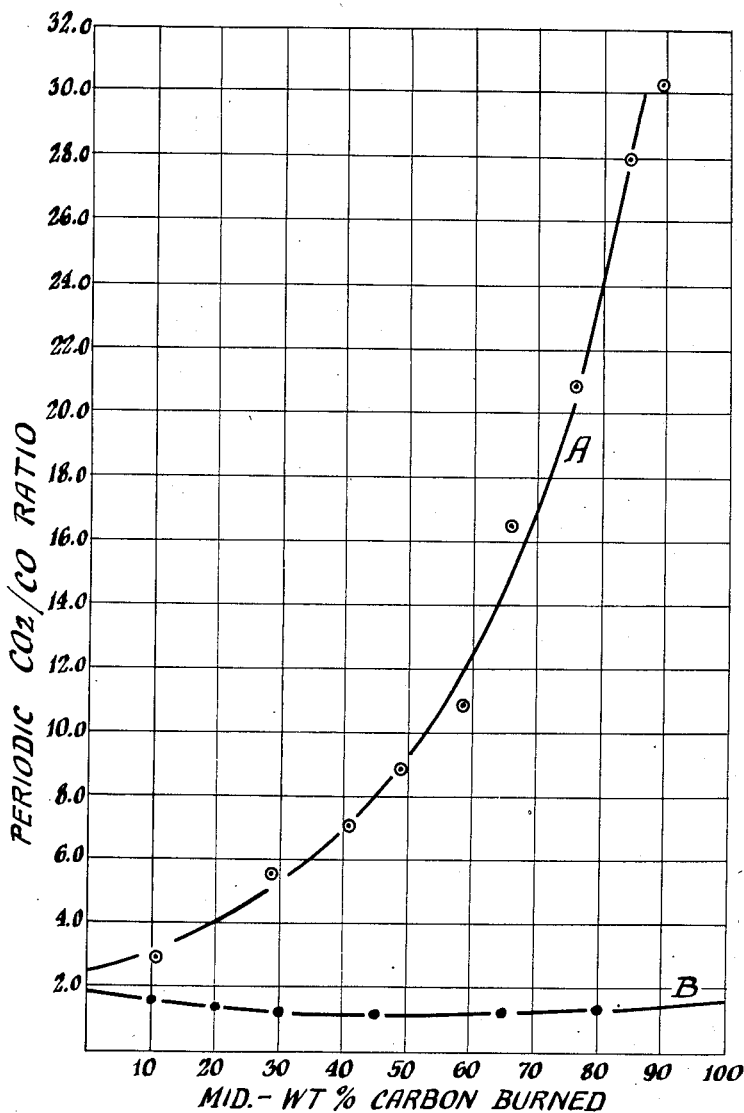

PROCESS FOR CONTINUOUS HYDROCARBON CONVERSION WITH A SILICA-ALUMINA-CHROMIUM OXIDE CATALYST

Charles J. Plank and Rowland C. Hansford, Woodbury, N. J., assignors to Socony-Vacuum Oil Company, Incorporated, a corporation of New York Application November 16, 1949, Serial No. 127,626

5 Claims. (Cl. 196—52)

This invention relates to an improved cracking process for the conversion of higher boiling hydrocarbons to lower boiling hydrocarbons such as gasoline by contact with a solid catalyst followed by burning regeneration of the catalyst and is particularly concerned with an improvement which increases the efficiency of modern cracking equipment by improving operation of continuous cracking apparatus in the regeneration part of the cycle. In accordance with the principles of this invention the catalyst is a synthetic composite of silica and alumina, preferably coprecipitated, together with about 0.01 to about 1.00 weight per cent of chromic oxide incorporated therein. It is a significant feature of the invention that the catalyst be tempered by heating to at least 1100° F. in a relatively dry atmosphere, i. e. no steam is added.

Catalytic cracking as now commercially practiced involves contacting hydrocarbon charge in vapor or liquid state with a porous solid adsorptive catalyst under conditions of temperature, pressure and time to achieve substantial conversion of the charge to lower boiling hydrocarbons. This cracking reaction results in deposition of a contaminant carbonaceous substance, commonly called coke, with consequent decline in catalytic activity of the solid catalyst. Under conditions to obtain efficient operation from a yield standpoint, it is found desirable to terminate the cracking reaction after a relatively short conversion run, say 5 to 15 minutes. The activity of the catalyst is then restored by burning off the coke in a regeneration stage. Large amounts of heat are released during this regeneration and precautions must be taken to prevent excessively high temperatures which would damage the apparatus or the catalyst. In the design of equipment, the regenerator is constructed with a view to handling a certain predetermined amount of coke per unit of time. The manner of cracking can vary greatly and the manner in which the cracking part of the cycle is carried out generally has considerable flexibility. However, the regenerator is usually the limiting factor on the operation and is capable of operation only within certain definite limits and tends to become a "bottle neck".

This is true even when the operation is of the older style wherein the catalyst is maintained as a fixed bed in each of several chambers, some of which are engaged in the cracking operation, while others are subjected to regeneration in preparation for again being placed in the cracking stage. With such bed-in-place operations, the regeneration peak temperature moves through the bed of catalyst between inlet and outlet for regeneration air and all portions of the bed must be subjected to such temperature control as to avoid approaching excessive temperature levels. The more modern cracking operations involve moving the catalyst through a conversion chamber wherein the cracking reaction takes place and then through a regenerator for burning-regeneration of the catalyst. Among the moving catalyst systems only two are now commercially important, namely, the TCC process wherein the catalyst moves through each chamber as a substantially compact moving bed and the Fluid process wherein the catalyst is suspended in the vapors to be converted and in regeneration air, alternately. Both the moving catalyst systems are operated at higher peak regeneration temperatures, largely because the regeneration proceeds, in part, as a burning of coke in which rise in temperature is not subject to control by heat transfer surfaces within a relatively short distance of each particle as in fixed bed operations. In any type of operation, controls are applied to keep the regeneration temperature below levels which will damage catalyst or equipment.

The catalysts used have long been recognized as falling into two rather definite groups and the distinction between these two groups becomes highly important in connection with the present invention. The early catalysts were activated clays of the Montmorillonite type, which had been subjected to acid leaching for activation. The more stable and more active synthetic catalysts have since largely replaced the activated clays and, for bed-in-place operations, the synthetic catalysts exhibit their increased activity and stability without showing serious disadvantages.

However, in the processes utilizing a compact moving bed the synthetic catalysts have given a great deal of trouble due to the resultant tendency of the regeneration fume to "afterburn" in the flues. It has been found that this afterburning is largely due to the low ratio of $CO_2/CO$ in the gases discharged from the regeneration. There is some evidence that slow combustion of the CO in fume from regeneration of synthetic catalyst results in an uncontrolled rise in temperature within the flues until ignition temperatures are reached. Actual propagation of flame appears to take place with serious damage to structural elements and evidence has been found that the flame may be propagated back into the regeneration zone with resultant damage to the catalyst. The tendency of regeneration fume to afterburn in TCC kilns is restricted to that from burning of approximately the first 40% of the coke as explained more fully hereinafter in connection with Figure 1.

No theory is advanced at this time for the difference in $CO_2/CO$ ratio between natural and synthetic catalysts. All the catalysts used commercially consist essentially of silica and alumina, although they may contain small amounts of impurities or substances added intentionally with a view to achieving some benefit. The tendency to afterburn is not related to rate of regeneration as can be shown by comparison of synthetic catalysts having widely different rates of regeneration. A contact mass prepared by milling and tableting a synthetic co-precipitate of silica and alumina gives a catalyst which has about the same distribution of small and large pores as is found in the natural clay catalysts. Such pelleted synthetics generally show a regeneration rate which is slightly more rapid than that of clay. On the other hand, catalysts produced by washing and drying a true hydrogel of silica and alumina, without disrupting the mechanical structure, consist predominantly of small pores, regenerate considerably slower than clay or pelleted synthetics and yet they show about the same $CO_2/CO$ ratio as do the pelleted synthetics, that ratio being about one-half the corresponding value for clay.

Catalytic cracking processes which employ these prior art catalysts suffer a number of difficulties which may be ascribed to the catalyst. Clay catalysts, for example, are susceptible to sulfur poisoning and to deterioration from exposure at the very high temperatures often encountered in the regeneration step of the process. Thus, any catalytic cracking process, operating on high sulfur-content cracking stocks with clay catalysts, requires frequent renewal of catalyst in order to maintain a sufficiently high activity level for economical operation. Likewise, frequent renewal of the clay catalyst is necessary where the activity drops to an uneconomical level because of the inherent thermal instability of clay catalysts.

Static-bed type of catalytic cracking, such as the Houdry process, has employed synthetic catalysts since about 1939, because of the higher yields of gasoline, higher octane number, and longer catalyst life which are characteristic of this type of catalyst.

The more modern types of catalytic cracking operations employing a continuously moving compact catalyst bed suffer the serious disadvantage of afterburning with synthetic catalysts of the prior art, which is not inherent in the Houdry type of operation.

In spite of the inherent disadvantages of clay catalysts described previously, this type of catalyst is being employed in some moving-bed catalytic cracking units, since the regeneration gases from prior art clay catalysts contain much less carbon monoxide than those from prior art synthetic catalysts. In normal operations of the TCC type, at least, afterburning of the regeneration gases is not encountered with clay catalysts, which are comprised of silica and alumina as the major components, and calcium oxide, magnesium oxide, and iron oxide as the principal minor constituents.

The tendency to afterburn on the part of synthetic silica-alumina catalysts presents a definite limitation on the capacity of apparatus in which such catalysts are employed. Regeneration temperatures must be maintained at such values that afterburning will not occur and it thus becomes impossible to achieve maximum regeneration capacity of the kilns with synthetic catalysts, since they cannot be regenerated at the maximum temperatures they are capable of withstanding. It is the primary object of this invention to modify known synthetic silica-alumina catalysts to render them suitable for use under conditions that utilize apparatus for cracking and regeneration of the catalysts as moving compact beds in the reactor and regenerator. Apparatus of this type is described in Simpson et al. Patent 2,419,507 issued April 22, 1947. The objects of the invention are achieved by incorporating into coprecipitated silica-alumina catalysts a suitable amount of chromic oxide. The amount of chromic oxide incorporated must be sufficient to raise the $CO_2/CO$ ratio to values at which afterburning will not occur but, due to the fact that larger amounts of chromic oxide adversely affect the cracking reaction, the amount of this third component must be kept at levels which will not have adverse effect on cracking yields.

It is an important feature of this invention that the chromic oxide is incorporated in such manner and in such amounts that desirably high yields of gasoline are maintained and that conversions of cracking stock to undesirable gas and coke are kept at suitably low levels. We have studied a large number of third components for synthetic silica-alumina catalysts over a broad range of concentrations and with extensive variation of the mode of introducing the various component oxides. It has been found that chromic oxide, when properly incorporated in the amounts to which this invention is limited, has unique effects.

Many means are known in the art for preparing composites of two or more inorganic oxides. Basically the active synthetic composites of silica and alumina are of the group which is commonly denoted as gels and include the products from drying of gelatinous precipitates, hydrogels and mixtures of gelatinous precipitates and hydrogels. The gels are derived by drying of substances obtained by precipitating the oxides from aqueous solution and, depending upon the method of precipitation, the oxides may separate from the mother liquor as a slimy mass or may set to a firm hydrogel embracing the entire volume of the aqueous medium from which the composite is prepared. An intermediate form is prepared by precipitation under such conditions that the gelatinous precipitate separates out, and the whole thereafter sets to a firm aquagel in which the gelatinous precipitate is occluded. The original gel may consist of a single oxide or may be a composite of two or more oxides precipitated together. Additionally, oxides may be added in any one of several methods known and used in the art. Unless the gel is formed under highly acid conditions, it generally contains zeolitic metal ions which can be replaced by other cations through a base exchange operation, thus substituting the oxide of the exchanged cations with that of the zeolitic cation. The wet gel may also be soaked in an aqueous solution of a salt which is decomposed to a metal oxide by heating. Thus, aluminum oxide can be incorporated in a silica gel by immersing the wet gel in a solution of aluminum nitrate and thereafter calcining. Wet precipitates may be milled together. One oxide may be precipitated in the pores of a previously prepared precipitate as by suspending silica gel in either wet or dried form in an aqueous solution of an aluminum salt and thereafter treating with an alumina precipitant such as ammonia. Good results are also obtained by milling together undried oxides or by soaking a porous form of one oxide in an aqueous solution of a salt which can be decomposed to a metal oxide by heating. Published information indicates that these and the other methods of preparing composites of oxides are roughly equivalent as respects their effect on catalytic activity for the cracking of hydrocarbons.

As shown by the data herein, particularly Table I, chromic oxides added to a coprecipitated silica-alumina composite result in some decrease of catalytic activity. In the present instance the decrease in activity is tolerable from an economic viewpoint because of the savings resultant from prevention of afterburning.

The silica-alumina composite so treated may have an alumina content of 3 to 20, preferably 5 to 13 per cent alumina by weight, and should preferably be prepared by coprecipitation of the silica and alumina within certain definite limits of acidity in order to provide a sufficiently high base exchange capacity. In general, the composite is coprecipitated from an aqueous solution having a pH value of about 4 to 10, preferably around 8.5. Thereafter the basic silica-alumina composite is permitted to age for some time by standing under non-drying conditions, as when immersed in an aqueous medium. The time of aging will depend upon the nature of the composite and the temperature of aging as is well understood in the art. In general, increased temperature reduces the necessary aging time, but we have found it desirable to age the composite for at least one hour no matter what temperature is employed. During this aging step it is important to avoid base exchange and we therefore prefer to age the composite in an aqueous medium which contains no substantial quantity of ions not present in the liquid phase of the freshly prepared composite. Specifically, the presence of any substantial amount of a polyvalent metal in the aging liquor is avoided. Where the original composite of silica and alumina is prepared from water glass, we may permit the presence of sodium in the aging liquor since sodium is present in the gel by derivation from the water glass.

It appears to make little difference how the chromia is incorporated into the composite so long as the latter is a coprecipitated composite of silica and alumina and the source of the chromia is a water soluble salt containing chromium as the cation. Cogelation and base exchange are preferred methods of introducing the chromia but this component may be introduced by impregnating a silica-alumina composite. Impregnation yields a product which seems to be slightly less stable so far as the $CO_2/CO$ ratio improvement is concerned and we therefore prefer cogelation and base exchange.

The catalyst of this invention is subjected to a high temperature tempering treatment prior to use in order to activate the same for control of $CO_2/CO$ ratio of regeneration fume. There is a clear relationship between chromium oxide content of the catalyst and requisite tempering temperature for adequate control. The lower the concentration of chromium oxide, the greater the temperature required for activation to suitable levels.

The maximum permissible chromium oxide content is controlled by the tendency of this oxide to increase the coke-forming propensity of the catalyst during cracking. Excessive coke formation becomes an important factor at concentrations of chromium oxide above 1% by weight of the dry catalyst. The lower limit of chromium oxide concentration is determined by that amount which can be activated without heating to temperatures which will cause permanent damage to the catalyst. The synthetic catalysts can withstand about 1400° F. for short periods, which temperature suffices to activate catalysts containing 0.01% by weight of chromium oxide, dry basis.

The temperature of activation required for effective control of $CO_2/CO$ ratio is 1100° F. to 1400° F. The lower part of the range will suffice for catalysts containing about 0.1 to about 1.0% of chromium oxide. The preferred catalysts of this invention contain about 0.05 to about 0.35% by dry weight of chromium oxide and are tempered at about 1150° F. to about 1250° F. for activation.

For best results, the catalyst should be retempered from time to time by heating to more than 1100° F. This may be accomplished by circulating all or a portion of the catalyst through a tempering kiln from time to time. It is preferable, however, to temper the catalyst during each cycle by permitting one zone of the regeneration kiln to rise to higher temperatures than those normally permitted, for example, about 1300° F. It is preferred that the tempering zone be one fairly near the bottom of the kiln where the small amounts of residual carbon are less likely to result in uncontrolled temperature rise.

The significant $CO_2/CO$ ratio is not the average of the flue gas from all zones of the kiln. The high burning rate of the first stages of regeneration gives a high total oxides of carbon and a greater opportunity for development of "hot spots" to ignite the gas. The portion of the kiln requiring a catalyst giving a high $CO_2/CO$ ratio is that in which the first 40% of the coke is burned off. Afterburning is not normally encountered in TCC kilns beyond this point. A peculiarity of silica-alumina-chromia catalysts is the shape of the curve representing variation in $CO_2/CO$ ratio with percentage of coke removed by burning. This relationship is shown in Figure 1 of the annexed drawing. Curve A represents the characteristics of the catalyst described in Example 10, while curve B represents the behaviour of catalysts not promoted with chromium oxide. These curves are typical of the types of catalysts shown and, while other catalysts of the same nature may be characterized by curves differing specifically from those shown, such curves are of the same general shape.

The points plotted on Figure 1 correspond to $CO_2/CO$ ratio over time successive regeneration intervals against "Mid-Weight Percent Carbon Burned." The latter value is the amount of carbon removed by burning at the mid point in any given time interval and the $CO_2/CO$ ratio is taken on the regeneration fume determined periodically over the specified time intervals. Reference is also made herein to "cumulative $CO_2/CO$ ratio." This ratio is determined on the total fume produced in burning off 85% of the carbon deposit. It will be seen that the extremely high $CO_2/CO$ ratios characteristic of the last 15% of regeneration with catalysts of this invention is not reflected in this value.

Tests have been devised whereby the ratio of carbon dioxide to carbon monoxide can be measured in the regeneration gas from any type of solid cracking catalyst, under standardized conditions. The same tests also give information as to the relative rates of carbon burn-off from various catalysts. It is to be noted, however, that there is no relation between $CO_2/CO$ ratio and regenerability index as measured by these tests. It is very significant that wide differences have been found between the $CO_2/CO$ ratio in the regeneration gases from catalysts with which afterburning has been associated in commercial practice (synthetic silica-alumina) and the $CO_2/CO$ ratio in the regeneration gases from clay catalysts with which afterburning is not normally encountered.

EXAMPLE 1

SILICA-ALUMINA GEL (93SiO$_2$–7Al$_2$O$_3$)

A silica-alumina gel consisting of 93 wt. per cent $SiO_2$, 7 wt. per cent $Al_2O_3$ was prepared and tested as a cracking catalyst in a standard Cat-A unit (Alexander and Shimp, National Petroleum News, vol. 36, P. R.-537, August 2, 1944). In addition the steam stability, $CO_2/CO$ ratio of the regeneration gases, and the regenerability index were determined. This gel represents a blank against which our improved cracking catalysts were compared.

The water glass used in making all the gels described in these examples was prepared by diluting a standard "N" brand water glass (Philadelphia Quartz Co.) of 42° Bé gravity and 3.2/1 ratio of $SiO_2/Na_2O$.

The method of preparation of this gel was as follows: Two solutions, A and B, were prepared. Solution A consisted of 535 cc. of water glass (containing 0.217 g. $SiO_2$/cc.) and 1200 cc. $H_2O$. Solution B was composed of 459 cc. $H_2O$, 87.5 cc. HCl (4.10 N.) and 219 cc. $Al_2(SO_4)_3$ solution (0.04 g. $Al_2O_3$/cc.). Both solutions were cooled to approximately 5° C. and then solution A was added to B with rapid mechanical agitation. The pH of the resulting sol was 8.6 and its gel time was about 40 seconds at about 8° C. After a period of aging at room temperature the gel was base-exchanged with $NH_4Cl$ solution, washed, dried and muffled.

This catalyst was tested, as were all of the catalysts described in the following examples, for cracking activity, steam stability, $CO_2/CO$ ratio and regenerability index. The results are shown in Table I. $CO_2/CO$=1.15.

A whole series of such gels has been prepared varying only the aging time or the pH to vary the bulk density of the resulting gels. These catalysts showed little variation in cracking activity of $CO_2/CO$ ratio but showed a great difference in regenerability index with variation in density. Figure 2 shows the relationship found. Thus in considering the regenerability index of subsequent examples presented in this information, the R. I. of the example in question should be compared to that of a silica-alumina gel of the same density (as read from Fig. 2).

EXAMPLE 2

A gel was prepared in the following manner to contain 93 per cent $SiO_2$—7 per cent $Al_2O_3$—0.005 per cent $Cr_2O_3$: Two solutions, A and B, were prepared. Solution A consisted of 750 cc. water glass (0.155 g. $SiO_2$/cc.) and 1200 cc. $H_2O$, while solution B included 283 cc. $H_2O$, 175 cc. $Al_2(SO_4)_3$ solution (0.05 g. $Al_2O_3$/cc.), 0.25 cc. $Cr(NO_3)_3$ solution (0.025 g. $Cr_2O_3$/cc.) and 92.0 cc. HCl (3.73 N.). Both solutions were cooled to about 5° C. and solution A was added to solution B with rapid agitation. The resulting sol had a pH=8.5, pc=5.00 and a gel time of approximately 40 seconds at 8° C. Three such batches were made and combined. After aging 72 hours at room temperature the gel was base exchanged with 1 per cent $Al_2(SO_4)_3$, washed free of sulfate, dried and muffled.

The cumulative $CO_2/CO$ ratio on regeneration was 1.3 when tempered at 1100° F. and 1.7 when tempered at 1400° F. The improvement in $CO_2/CO$ is definite, but not sufficiently practical.

EXAMPLE 3

In a manner entirely analogous to that used in Example 2, a hydrogel was prepared to contain 93 per cent $SiO_2$—7 per cent $Al_2O_3$—0.01 per cent $Cr_2O_3$. In this case solution A contained 750 cc. water glass (0.155 g. $SiO_2$/cc.) and 1700 cc. $H_2O$ and solution B contained 282 cc. $H_2O$, 175 cc. $Al_2(SO_4)_3$ (0.05 g. $Al_2O_3$/cc.), 0.5 cc. $Cr(NO_3)_3$ (0.025 g. $Cr_2O_3$/cc.) and 92.0 cc. HCl (3.73 N.). Three such batches were made and processed in a manner similar to that of Example 2.

The test results on this catalyst are shown in Table I. Cumulative $CO_2/CO$=1.5 when tempered at 1100° F. and 2.2 when tempered at 1400° F.

EXAMPLE 4

In a manner analogous to that for Example 2 a hydrogel was prepared to contain 93 per cent $SiO_2$—7 per cent $Al_2O_3$—0.05 per cent $Cr_2O_3$. In this case solution A contained 581 cc. water glass (0.200 g. $SiO_2$/cc.) and 1200 cc. $H_2O$ and solution B contained 175 cc. $Al_2(SO_4)_3$ (0.05 g. $Al_2O_3$)/cc.), 1.25 cc. $Cr(NO_3)_3$ (0.05 g. $Cr_2O_3$/cc.), 87 cc. HCl (3.80 N.) and 456 cc. $H_2O$. The hydrogel was processed as in Example 2 after aging 48 hours.

The test results for this catalyst are given in Table I. Cumulative $CO_2/CO$=1.6 when tempered at 1100° F. and 3.3 when tempered at 1400° F.

EXAMPLE 5

In a manner analogous to that used in Example 2, a hydrogel was made to contain 92.9 per cent $SiO_2$—7 per cent $Al_2O_3$—0.1 per cent $Cr_2O_3$. In this case solution A contained 569 cc. water glass (0.204 g. $SiO_2$/cc.) and 659 cc. $H_2O$ and solution B contained 175 cc. $Al_2(SO_4)_3$ (0.05 g. $Al_2O_3$/cc.), 2.50 cc. $Cr(NO_3)_2$ (0.05 g. $Cr_2O_3$/cc.), 83 cc. HCl (3.91 N.) and 1000 cc. $H_2O$. The hydrogel was processed as in Example 2 after aging 16 hours.

The test results on this catalyst are given in Tables I and III. Cumulative $CO_2/CO$=1.8 when tempered at 1100° F. and 4.0 when tempered at 1400° F.

EXAMPLE 6

A hydrogel was prepared to contain 92.1 per cent $SiO_2$—6.9 per cent $Al_2O_3$—1.0 per cent $Cr_2O_3$ by a method analogous to that of Example 6. In this case solution A contained 1200 cc. $H_2O$ and 564 cc. water glass (0.204 g. $SiO_2$/cc.) and solution B contained 458 cc. $H_2O$, 172.5 cc. $Al_2(SO_4)_3$ (0.05 g. $Al_2O_3$/cc.), 25.0 cc. $Cr(NO_3)_3$ (0.05 g. $Cr_2O_3$/cc.) and 80.0 cc. HCl (3.80 N.). The hydrogel was processed exactly as in Example 6.

The test data for this catalyst are given in Tables I and III. Cumulative $CO_2/CO=2.1$ when tempered at 1100° F. and 9.6 when tempered at 1400° F. The activity of this catalyst is very low and the coke is too high.

EXAMPLE 7

To show that the $Cr_2O_3$ may be introduced by base exchange, the following experiment was performed. A silica-alumina gel exactly analogous to that of Example 1 was prepared. After aging 48 hours the hydrogel was base exchanged with a solution containing 1 per cent $Al_2(SO_4)_3$ and 0.002 per cent $Cr(NO_3)_3$. The hydrogel was then washed, dried and calcined.

The test data on this catalyst are given in Table I and are similar to those for the gel of Example 3 where the $Cr_2O_3$ was introduced by cogelation. Cumulative $CO_2/CO=1.3$ when tempered at 1100° F. and 2.0 when tempered at 1400° F. Analyzed chromia content=0.01% $Cr_2O_3$.

EXAMPLE 8

In order to determine the effect of adding the $Cr_2O_3$ by impregnation, the following experiment was carried out. A 500 cc. quantity (382 g.) of commercial bead catalyst was impregnated with 0.08 per cent $Cr_2O_3$ from a $CrO_3$ solution. The product was dried and calcined. The test results for this catalyst are given in Table I. Cumulative $CO_2/CO=1.4$ when tempered at 1100° F. and 3.2 when tempered at 1400° F.

EXAMPLE 9

Another hydrogel was prepared by a method analogous to that of Example 2 to contain 92.9 per cent $SiO_2$—7 per cent $Al_2O_3$—0.10 per cent $Cr_2O_3$ with a longer aging time than that of Example 5. In this case solution A contained 1200 cc. $H_2O$ and 569 cc. water glass (0.204 g. $SiO_2$/cc.) and solution B contained 467 cc. $H_2O$, 175 cc. $Al_2(SO_4)_3$ (0.05 g. $Al_2O_3$/cc.), 2.50 cc. $Cr(NO_3)_3$ (0.05 g. $Cr_2O_3$/cc.) and 86.0 cc. HCl (3.95 N.). The hydrogel was processed as in Example 2 after aging 72 hours.

The test results for this catalyst are given in Tables I and II. Cumulative $CO_2/CO=2.0$ when tempered at 1100° F. and 5.2 when tempered at 1400° F.

EXAMPLE 10

In a manner exactly analogous to that for Example 3, a hydrogel was prepared to contain 92.9 per cent $SiO_2$—7 per cent $Al_2O_3$—0.15 per cent $Cr_2O_3$. In this case, solution A contained 601 cc. water glass (0.193 g. $SiO_2$/cc.)+1200 cc. $H_2O$ and solution B contained 175 cc. $Al_2(SO_4)_3$ solution (0.05 g. $Al_2O_3$/cc.)+3.75 cc. $Cr(NO_3)_3$ solution (0.05 g. $Cr_2O_3$/cc.)+83.0 cc. HCl (3.98 N)+438 cc. $H_2O$. The resulting hydrogel formed at pH=8.5. The gel was processed as in Example 3. The test results for this catalyst are given in Tables I and II.

EXAMPLE 11

In a manner exactly analogous to Example 3, a hydrogel was prepared to contain 92.8 per cent $SiO_2$—7 per cent $Al_2O_3$—0.20 per cent $Cr_2O_3$. In this case, solution A contained 592 cc. water glass (0.196 g. $SiO_2$/cc.)+1200 cc. $H_2O$ and solution B contained 175 cc. $Al_2(SO_4)_3$ solution (0.05 g. $Al_2O_3$/cc.)+5.00 cc. $Cr(NO_3)_3$ solution (0.05 g. $Cr_2O_3$/cc.)+82.0 cc. HCl (3.98 N)+455 cc. $H_2O$. The resulting hydrogel formed at pH=8.5. The gel was processed as in Example 3. The test results for this catalyst are given in Tables I and II.

EXAMPLE 12

In a manner exactly analogous to that for Example 3, a hydrogel was prepared to contain 92.7 per cent $SiO_2$—7 per cent $Al_2O_3$—0.35 per cent $Cr_2O_3$. In this case, solution A contained 592 cc. water glass 0.196 g. $SiO_2$/cc.)+1200 cc. $H_2O$ and solution B contained 175 cc. $Al_2(SO_4)_3$ solution (0.05 g. $Al_2O_3$/cc.)+875. cc. $Cr(NO_3)_3$ solution (0.05 g. $Cr_2O_3$/cc.)+81.0 cc. HCl (3.98 N)+443 cc. $H_2O$. The resulting hydrogel formed at pH=8.4. The gel was processed as in Example 3. The test results for this catalyst are given in Tables I and II.

Cracking data were obtained on these catalysts fresh (after tempering at 1400° F.) and again after steam treatment (12 hours at 1200° F. in 100 per cent steam followed by tempering at 1100° F.). Each sample was then tested for regenerability properties and the $CO_2/CO$ ratio after tempering at 1100°, 1200°, 1300° and 1400° F., respectively.

The cracking results for these catalysts are summarized in Table I. Here the results before steam treatment were obtained on catalysts tempered 10 hours at 1400° F. Those after steam treatment were obtained on catalysts tempered 3 hours at 1100° F. The extra 5 hours of steam treatment used on some of the catalysts has been found not to change appreciably the cracking activity of silica-alumina catalysts. However, it does overcome the effect of tempering the catalyst previously to 1400° F. so far as the $CO_2/CO$ effect with the present chromia-containing catalysts is concerned. In the case of catalysts indicated in Table I (and Table III) the original steam treating conditions were standard (10 hours at 1200° F. with 100 per cent steam). Since they were then tempered to 1400° F. before activity tests were made, a subsequent 5 hour steam treat (at the same conditions) was necessary to overcome the effect on the $CO_2/CO$ ratio of the 1400° F. tempering. At the same time it was found that the tempering temperature also had an effect on the product distribution. The activity in gasoline production was moderately affected but the coke make was quite strongly affected by the difference between tempering at 1100° F. and 1400° F. The change is shown in Table III. These facts show the necessity of balancing the improvement in $CO_2/CO$ ratio against the increase in coke make brought about by an increase in tempering temperature.

TABLE I

*Properties of silica-alumina-chromia catalysts*

| Example | Wt. Percent $Cr_2O_3$ [4] | Av. $CO_2$/CO [1] (Mol Ratio) | Bulk [2] Density | Cat-A Cracking Data ||||||
|---|---|---|---|---|---|---|---|---|---|
| | | | | Initial ||| After Steam Treat [3] |||
| | | | | Vol. Percent Gasoline, 410° F. | Wt. Percent Coke | Gaso/Coke | Vol. Percent Gasoline, 410° F. | Wt. Percent Coke | Gaso/Coke |
| 1 | 0 | 1.15 | 0.77 | 48.5 | 4.6 | 10.5 | 34.7 | 2.1 | 16.5 |
| 3 | 0.01 | 1.5 | 0.79 | 49.8 | 4.9 | 10.2 | *32.4 | 1.6 | 20.0 |
| 4 | 0.05 | 1.6 | 0.72 | 46.6 | 3.8 | 12.2 | *32.8 | 1.4 | 23.4 |
| 5 | 0.10 | 1.8 | 0.77 | 46.8 | 5.1 | 9.2 | *35.8 | 2.0 | 17.9 |
| 6 | 1.0 | 2.1 | 0.81 | 28.6 | 7.2 | 4.0 | *32.5 | 1.5 | 21.6 |
| 7 | 0.01 | 2.0 | 0.71 | 48.2 | 4.3 | 11.2 | 34.9 | 2.0 | 17.5 |
| 8 | 0.08 | 3.1 | 0.79 | 41.6 | 3.4 | 12.2 | *36.1 | 1.8 | 20.0 |
| 9 | 0.10 | 2.0 | 0.78 | 49.3 | 4.0 | 12.3 | 37.5 | 2.1 | 17.8 |
| 10 | 0.15 | 2.9 | 0.80 | 49.6 | 4.8 | 10.3 | 34.7 | 1.9 | 18.3 |
| 11 | 0.20 | 2.8 | 0.81 | 50.5 | 5.0 | 10.1 | 35.4 | 2.0 | 17.7 |
| 12 | 0.35 | 3.3 | 0.74 | 47.9 | 4.4 | 10.9 | 36.8 | 1.9 | 19.3 |

[1] Temperated at 1100° F. This is the cumulative $CO_2$/CO ratio over the first 85% of the regeneration period.
[2] The bulk density after steam treatment.
[3] Steam treated 10 hours (15 hours for those with *), at 1200° F. with 100% steam then tempered at 1100° F.
[4] Wt. percent $Cr_2O_3$ calculated from the composition of reacting liquids.

TABLE II

*The effect of tempering temperature on $CO_2$/CO ratio of $SiO_2$—$Al_2O_3$—$Cr_2O_3$ catalysts*

| Example Number | Wt. Percent $Cr_2O_3$ | $CO_2$/CO Ratio at 20% Regeneration Tempering Temperature ||||
|---|---|---|---|---|---|
| | | 1,100° | 1,200° | 1,300° | 1,400° |
| 3 | 0.01 | 1.3 | ------ | 1.6 | 2.0 |
| 4 | 0.05 | 1.35 | 1.7 | 2.3 | 2.7 |
| 9 | 0.10 | 1.65 | 2.3 | 2.7 | 3.4 |
| 10 | 0.15 | 2.1 | 3.9 | 4.1 | 4.8 |
| 11 | 0.20 | 2.0 | 4.1 | 5.1 | 5.5 |
| 12 | 0.35 | 2.3 | 4.3 | 6.4 | ------ |

TABLE III

*The effect of tempering temperature on coke make of $SiO_2$—$Al_2O_3$—$Cr_2O_3$ catalysts*

| Catalyst, Ex. No. | Percent $Cr_2O_3$ | Tempered at °F. | Cat-A Cracking Results [1] ||||
|---|---|---|---|---|---|---|
| | | | Gas Gravity | Wt. Percent Gas | Wt. Percent Coke | Vol. Percent Gasoline, 410° F. |
| 3 | 0.01 | 1,100 | 1.53 | 3.5 | 1.6 | 32.4 |
| | | 1,400 | 1.41 | 4.7 | 2.3 | 35.3 |
| 4 | 0.05 | 1,100 | 1.48 | 3.6 | 1.4 | 32.8 |
| | | 1,400 | 1.49 | 5.4 | 1.7 | 32.2 |
| 5 | 0.10 | 1,100 | 1.47 | 4.7 | 2.0 | 35.8 |
| | | 1,400 | 1.28 | 6.1 | 2.6 | 34.6 |
| 6 | 1.0 | 1,100 | 1.52 | 3.6 | 1.5 | 32.5 |
| | | 1,400 | 1.16 | 4.8 | 2.0 | 27.7 |

[1] Cracking results after steam treatment followed by tempering at the indicated temperature. The catalysts tempered at 1,400° F. had been steam-treated 10 hours at 1,200° F. with 100% steam. They were then re-steam-treated 5 hours at 1,200° F. with 100% steam and tempered at 1,100° F.

We claim:

1. In a process for continuous catalytic conversion of heavier hydrocarbons by catalytic cracking to hydrocarbons within the gasoline boiling range characterized by the steps of passing a particle-form catalyst containing a major proportion of silica and a minor proportion of alumina downwardly as a compact moving bed through a conversion zone, contacting said heavier hydrocarbons with said catalyst in said conversion zone to induce said conversion with concomitant deposition on said catalyst of a combustible contaminating deposit, thereafter passing catalyst from said conversion zone carrying said deposit downwardly through a plurality of regeneration zones in series as a substantially compact moving bed, passing combustion-supporting gas in contact with said catalyst in said regeneration zones to burn off said combustible deposit, thereby forming regeneration fume as a result of burning said deposit of which the fume from the earlier of the zones has a tendency to burn in flues and the like due to the relatively low ratio of carbon dioxide to carbon monoxide therein when said catalyst consists of silica and alumina and thereafter returning the regenerated catalyst to said conversion zone; the improvement which comprises circulating as said catalyst a particle-form composite of silica, alumina and chromium oxide in which the chromium oxide constitutes from about 0.01 to about 1.0 per cent by dry weight, said catalyst being tempered in a substantially dry atmosphere at a temperature between about 1100° F. and 1400° F. after passage through said conversion zone and before return to said conversion zone.

2. In a process for continuous catalytic conversion of heavier hydrocarbons by catalytic cracking to hydrocarbons within the gasoline boiling range characterized by the steps of passing a particle-form catalyst containing a major proportion of silica and a minor proportion of alumina downwardly as a compact moving bed through a conversion zone, contacting said heavier hydrocarbons with said catalyst in said conversion zone to induce said conversion with concomitant deposition on said catalyst of a combustible contaminating deposit, thereafter passing catalyst from said conversion zone carrying said deposit downwardly through a plurality of regeneration zones in series as a substantially compact moving bed, passing combustion-supporting gas in contact with said catalyst in said regeneration zones to burn off said combustible deposit, thereby forming regeneration fume as a result of burning said deposit of which the fume from the earlier of the zones has a tendency to burn in flues and the like due to the relatively low ratio of carbon dioxide to carbon monoxide therein when said catalyst consists of silica and alumina and thereafter returning the regenerated catalyst to said conversion zone; the improvement which comprises circulating as said catalyst a particle-form composite of silica, alumina and chromium oxide in which the chromium oxide constitutes from about 0.05 to about 0.35 per cent by dry weight, said catalyst being tempered in a substantially dry atmosphere at a temperature between about 1100° F. and 1400° F. after passage through said conversion zone and before return to said conversion zone.

3. In a process for continuous catalytic conversion of heavier hydrocarbons by catalytic cracking to hydrocarbons within the gasoline boiling range characterized by the steps of passing a particle-form catalyst containing a major proportion of silica and a minor proportion of alumina downwardly as a compact moving bed through a conversion zone, contacting said heavier hydrocarbons with said catalyst in said conversion zone to induce said conversion with concomitant deposition on said catalyst of a combustible contaminating deposit, thereafter passing catalyst from said conversion zone carrying said deposit downwardly through a plurality of regeneration zones in series as a substantially compact moving bed, passing combustion-supporting gas in contact with said catalyst in said regeneration zones to burn off said combustible deposit, thereby forming regeneration fume as a result of burning said deposit of which the fume from the earlier of the zones has a tendency to burn in flues and the like due to the relatively low ratio of carbon dioxide to carbon monoxide therein when said catalyst consists of silica and alumina and thereafter returning the regenerated catalyst to said conversion zone; the improvement which comprises circulating as said catalyst a particle-form composite of silica, alumina and chromium oxide in which the chromium oxide constitutes from about 0.01 to about 1.0 per cent by dry weight, said catalyst being tempered in a substantially dry atmosphere at a temperature between about 1150° F. and 1250° F. after passage through said conversion zone and before return to said conversion zone.

4. In a process for continuous catalytic conversion of heavier hydrocarbons by catalytic cracking to hydrocarbons within the gasoline boiling range characterized by the steps of passing a particle-form catalyst containing a major proportion of silica and a minor proportion of alumina downwardly as a compact moving bed through a conversion zone, contacting said heavier hydrocarbons with said catalyst in said conversion zone to induce said conversion with concomitant deposition on said catalyst of a combustible contaminating deposit, thereafter passing catalyst from said conversion zone carrying said deposit downwardly through a plurality of regeneration zones in series as a substantially compact moving bed, passing combustion-supporting gas in contact with said catalyst in said regeneration zones to burn off said combustible deposit, thereby forming regeneration fume as a result of burning said deposit of which the fume from the earlier of the zones has a tendency to burn in flues and the like due to the relatively low ratio of carbon dioxide to carbon monoxide therein when said catalyst consists of silica and alumina and thereafter returning the regenerated catalyst to said conversion zone; the improvement which comprises circulating as said catalyst a particle-form composite of silica, alumina and chromium oxide in which the chromium oxide constitutes from about 0.05 to about 0.35 per cent by dry weight, said catalyst being tempered in a substantially dry atmosphere at a temperature between about 1150° F. and 1250° F. after passage through said conversion zone and before return to said conversion zone.

5. In a process for continuous catalytic conversion of heavier hydrocarbons by catalytic cracking to hydrocarbons within the gasoline boiling range characterized by the steps of passing a particle-form catalyst containing a major proportion of silica and a minor proportion of alumina downwardly as a compact moving bed through a conversion zone, contacting said heavier hydrocarbons with said catalyst in said conversion zone to induce said conversion with concomitant deposition and said catalyst of a combustible contaminating deposit, thereafter passing catalyst from said conversion zone carrying said deposit downwardly through a plurality of regeneration zones in series as a substantially compact moving bed, passing combustion-supporting gas in contact with said catalyst in said regeneration zones to burn off said combustible deposit, thereby forming regeneration fume as a result of burning said deposit of which the fume from the earlier of the zones has a tendency to burn in flues and the like due to the relatively low ratio of carbon dioxide to carbon monoxide therein when said catalyst consists of silica and alumina and thereafter returning the regenerated catalyst to said conversion zone; the improvement which comprises circulating as said catalyst a spheroidal particle-form composite of silica, alumina and chromium oxide in which the chromium oxide constitutes from about 0.05 to about 0.35 per cent by dry weight, said catalyst being tempered in a substantially dry atmosphere at a temperature between about 1150° F. and 1250° F. after passage through said conversion zone and before return to said conversion zone.

CHARLES J. PLANK.
ROWLAND C. HANSFORD.

References Cited in the file of this patent

UNITED STATES PATENTS

| Number | Name | Date |
| --- | --- | --- |
| 2,268,109 | Connolly | Dec. 30, 1941 |
| 2,436,927 | Kassel | Mar. 2, 1948 |
| 2,437,531 | Huffman | Mar. 9, 1948 |
| 2,441,311 | Crowley et al. | May 11, 1948 |